(12) United States Patent
McLaughlin

(10) Patent No.: US 9,945,366 B1
(45) Date of Patent: Apr. 17, 2018

(54) WHEELED PUMPING STATION

(71) Applicant: Halford McLaughlin, Anderson, IN (US)

(72) Inventor: Halford McLaughlin, Anderson, IN (US)

( * ) Notice: Subject to any disclaimer, the term of this patent is extended or adjusted under 35 U.S.C. 154(b) by 2 days.

(21) Appl. No.: 15/408,489

(22) Filed: Jan. 18, 2017

(51) Int. Cl.
| | |
|---|---|
| *F04B 17/06* | (2006.01) |
| *B60K 6/46* | (2007.10) |
| *B60K 6/405* | (2007.10) |
| *B60K 6/36* | (2007.10) |
| *B60K 6/52* | (2007.10) |
| *B60K 25/00* | (2006.01) |
| *B60L 8/00* | (2006.01) |
| *B60L 11/12* | (2006.01) |
| *G05D 1/00* | (2006.01) |
| *G05D 1/02* | (2006.01) |
| *F04B 17/03* | (2006.01) |
| *F04B 17/00* | (2006.01) |

(52) U.S. Cl.
CPC ................ *F04B 17/06* (2013.01); *B60K 6/36* (2013.01); *B60K 6/405* (2013.01); *B60K 6/46* (2013.01); *B60K 6/52* (2013.01); *B60K 25/00* (2013.01); *B60L 8/003* (2013.01); *B60L 11/123* (2013.01); *F04B 17/006* (2013.01); *F04B 17/03* (2013.01); *G05D 1/0022* (2013.01); *G05D 1/0219* (2013.01); *G05D 1/0278* (2013.01); *B60K 2025/005* (2013.01)

(58) Field of Classification Search
CPC ........ F04B 17/06; F04B 17/03; F04B 17/006; B60L 8/003; B60L 11/123; G05D 1/0278; G05D 1/0219; G05D 1/0022; B60K 25/00; B60K 6/52; B60K 6/36; B60K 6/405; B60K 6/46; B60K 2025/005

See application file for complete search history.

(56) References Cited

U.S. PATENT DOCUMENTS

| | | |
|---|---|---|
| D28,577 S | 5/1898 | Streich |
| 2,214,677 A | 9/1940 | North |
| 3,008,422 A | 11/1961 | Crisafulli |
| 3,490,380 A | 1/1970 | Beckett |
| 4,070,135 A * | 1/1978 | Eller ..................... F04D 29/605 37/317 |
| 4,175,916 A | 11/1979 | Crisafulli |

(Continued)

FOREIGN PATENT DOCUMENTS

| | | | |
|---|---|---|---|
| FR | 2685374 A1 | * | 6/1993 |
| RU | 152152 U1 | * | 5/2015 |

*Primary Examiner* — Jacob B Meyer

(57) ABSTRACT

The wheeled pumping station includes a front axle and a rear axle with wheels that mobilize a pumping station supported via a chassis. The pumping station is enclosed within a housing. The housing supports a pump from which an intake hose descends down. The pump is wired to a powering member. The powering member is also wired to at least one solar panel provided on a top surface of the housing. The powering member is wired to a computer, GPS unit, and transceiver. The computer is able to track location and maneuver the wheeled pumping station to different locations as needed. The pump is connected to both the intake hose and an irrigation pipe such that water collected via the pump is removed from the land, and transferred via the irrigation pipe to another location.

5 Claims, 6 Drawing Sheets

(56) References Cited

U.S. PATENT DOCUMENTS

| | | | | | |
|---|---|---|---|---|---|
| 5,197,158 | A | * | 3/1993 | Moini | E04H 4/1654 15/1.7 |
| 5,245,723 | A | * | 9/1993 | Sommer | E04H 4/1654 15/1.7 |
| 5,265,810 | A | * | 11/1993 | Chapman | A01G 25/097 239/724 |
| 5,279,672 | A | * | 1/1994 | Betker | A47L 11/305 134/18 |
| 5,344,083 | A | * | 9/1994 | Jackson | A01G 25/09 180/346 |
| 5,364,233 | A | * | 11/1994 | Benoit | F04D 29/2211 417/231 |
| 5,696,675 | A | * | 12/1997 | Nakamura | G05D 1/0219 180/167 |
| 5,921,338 | A | * | 7/1999 | Edmondson | B60G 21/045 180/6.5 |
| 6,104,314 | A | * | 8/2000 | Jiang | B60Q 9/004 340/436 |
| 6,182,453 | B1 | * | 2/2001 | Forsberg | B01D 5/0072 62/125 |
| 6,396,239 | B1 | * | 5/2002 | Benn | F24J 2/36 307/150 |
| 6,830,120 | B1 | * | 12/2004 | Yashima | A47L 11/10 15/340.1 |
| 6,863,827 | B2 | * | 3/2005 | Saraceno | C02F 9/005 210/241 |
| D575,843 | S | * | 8/2008 | Werner | D23/207 |
| 7,635,254 | B2 | * | 12/2009 | Kunz | F04D 3/00 198/313 |
| 8,051,527 | B2 | * | 11/2011 | Lee | A47L 9/009 15/319 |
| 8,545,194 | B2 | * | 10/2013 | Irving | F04B 17/006 417/411 |
| 8,814,533 | B2 | | 8/2014 | Exner | |
| 9,074,386 | B2 | * | 7/2015 | Hong | B08B 9/08 |
| 9,399,877 | B2 | * | 7/2016 | Erlich | E04H 4/1654 |
| 9,808,137 | B2 | * | 11/2017 | Lamon | G05D 1/0219 |
| 2004/0021439 | A1 | * | 2/2004 | Porat | E04H 4/1654 318/567 |
| 2004/0035636 | A1 | * | 2/2004 | Julien | B66F 11/042 182/69.6 |
| 2005/0209736 | A1 | * | 9/2005 | Kawagoe | A47L 11/20 700/245 |
| 2006/0048800 | A1 | * | 3/2006 | Rast | A47L 1/02 134/56 R |
| 2008/0029646 | A1 | * | 2/2008 | Von Mohos | B64D 1/16 244/129.1 |
| 2008/0087299 | A1 | * | 4/2008 | Erlich | E04H 4/1654 134/6 |
| 2009/0032314 | A1 | * | 2/2009 | Speichinger | B60K 17/342 180/6.5 |
| 2009/0188148 | A1 | * | 7/2009 | Orris | A01M 31/06 43/3 |
| 2010/0037418 | A1 | * | 2/2010 | Hussey | A47L 5/30 15/319 |
| 2010/0095559 | A1 | * | 4/2010 | Buckner | E02F 3/8825 37/304 |
| 2010/0307545 | A1 | * | 12/2010 | Osaka | B08B 3/024 134/198 |
| 2012/0148427 | A1 | * | 6/2012 | Irving | F04B 17/006 417/411 |
| 2013/0098816 | A1 | * | 4/2013 | Elfstrom | C02F 1/00 210/153 |
| 2013/0151061 | A1 | * | 6/2013 | Hong | B08B 9/08 701/25 |
| 2014/0124000 | A1 | * | 5/2014 | Hillforth | A01C 3/04 134/6 |
| 2014/0356198 | A1 | * | 12/2014 | Rulli | F04B 17/006 417/360 |
| 2016/0145884 | A1 | * | 5/2016 | Erlich | E04H 4/1654 15/1.7 |
| 2016/0298306 | A1 | * | 10/2016 | de Kontz | E01H 3/02 |
| 2016/0340922 | A1 | * | 11/2016 | Erlich | E04H 4/1654 |
| 2017/0020087 | A1 | * | 1/2017 | Younis | A01G 25/16 |
| 2017/0079236 | A1 | * | 3/2017 | Womble | A01K 1/033 |
| 2017/0079247 | A1 | * | 3/2017 | Womble | A01K 27/009 |
| 2017/0083018 | A1 | * | 3/2017 | Womble | A01K 27/009 |
| 2017/0215371 | A1 | * | 8/2017 | Fransen | A01K 1/0103 |
| 2017/0280960 | A1 | * | 10/2017 | Ziegler | A47L 11/302 |

* cited by examiner

WHEELED PUMPING STATION

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of farming and agricultural equipment, more specifically, a pumping station that is wheeled and is semi-autonomous.

Farming utilizes a large swath of land. In some locations on a field, water may collect. Where water collects and pools, the land is unable to generate crops or be used as needed. This can limit the profitability of a farm because now the land is limited to a particular useful size as opposed to being able to use all of the available land.

Traditionally, pumps can be hauled out to the waterlogged portion of land, and water is collected, and removed. What is needed is a semi-autonomous pumping station that is mobile, and can be sent off to a waterlogged portion of land in order to pump water away from said location. The device of the present application addresses this need by providing a pumping station that can be directed to a particular location in order to collect water via a pump, and said water being transferred via a pipe to another location where the water is used for transferred at the discretion of the end user.

SUMMARY OF INVENTION

The wheeled pumping station includes a front axle and a rear axle with wheels that mobilize a pumping station supported via a chassis. The pumping station is enclosed within a housing. The housing supports a pump from which an intake hose descends down. The pump is wired to a powering member. The powering member is also wired to at least one solar panel provided on a top surface of the housing. The powering member is wired to a computer, GPS unit, and transceiver. The computer is able to track location and maneuver the wheeled pumping station to different locations as needed. The pump is connected to both the intake hose and an irrigation pipe such that water collected via the pump is removed from the land, and transferred via the irrigation pipe to another location. Either or both the front axle or the rear axle is in mechanical connection with a drive motor that is located within the housing. The drive motor is responsible for mobilizing the wheeled pumping station.

These together with additional objects, features and advantages of the wheeled pumping station will be readily apparent to those of ordinary skill in the art upon reading the following detailed description of the presently preferred, but nonetheless illustrative, embodiments when taken in conjunction with the accompanying drawings.

In this respect, before explaining the current embodiments of the wheeled pumping station in detail, it is to be understood that the wheeled pumping station is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the wheeled pumping station.

It is therefore important that the claims be regarded as including such equivalent construction insofar as they do not depart from the spirit and scope of the wheeled pumping station. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

Figure 1:
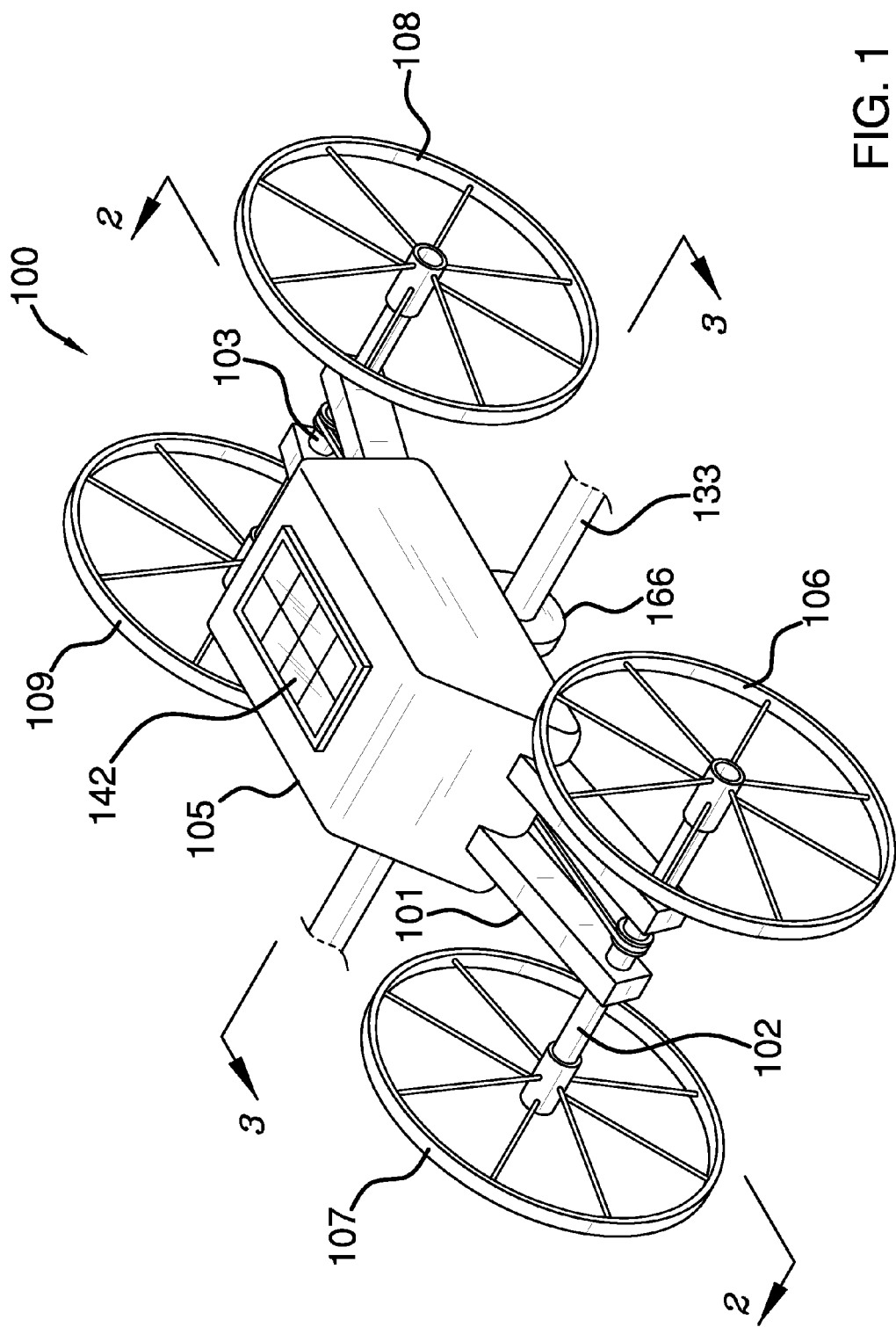
FIG. 1 is a perspective view of an embodiment of the disclosure.
Figure 2:
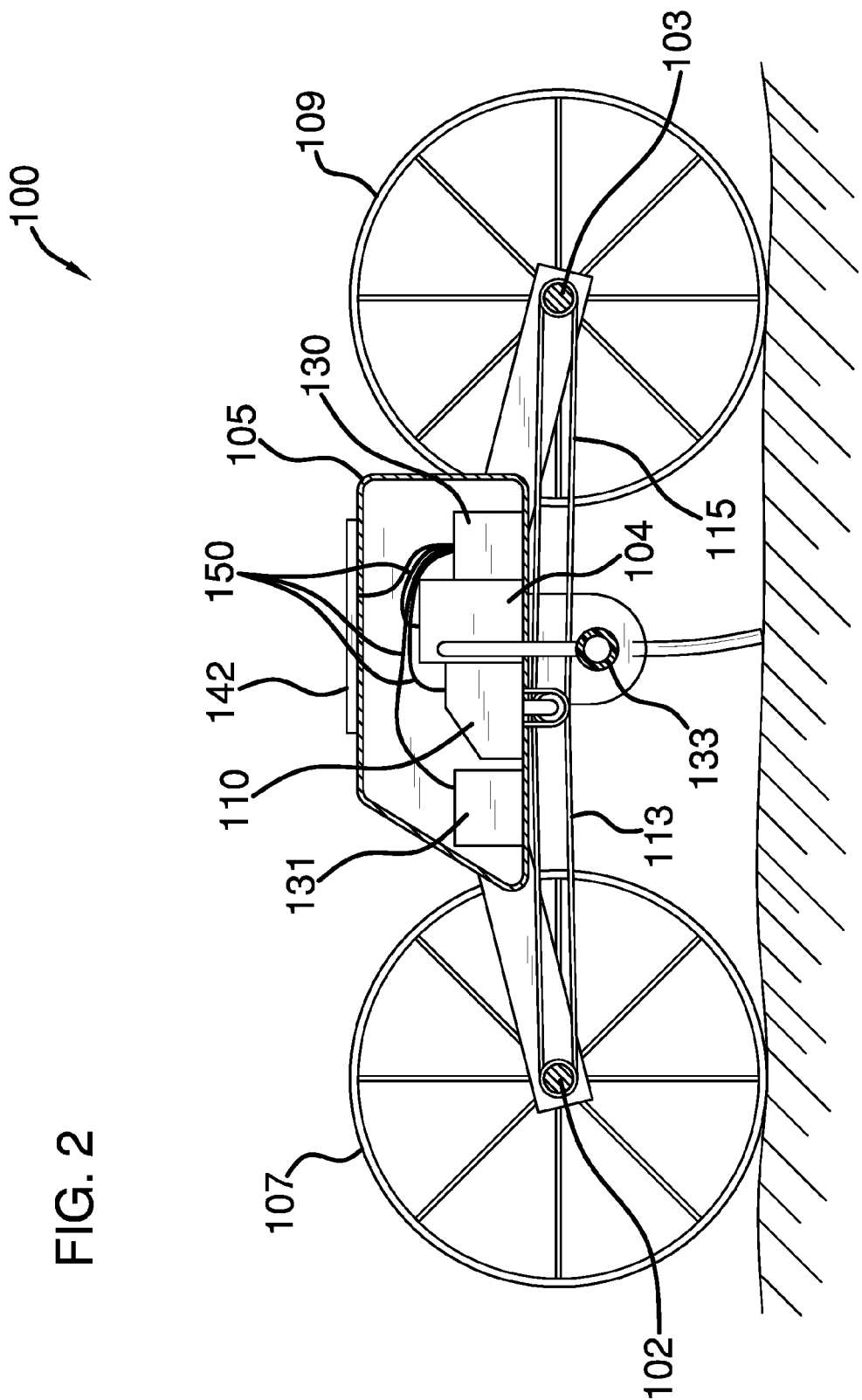
FIG. 2 is a cross-sectional view of an embodiment of the disclosure along line 2-2 in FIG. 1.
Figure 3:
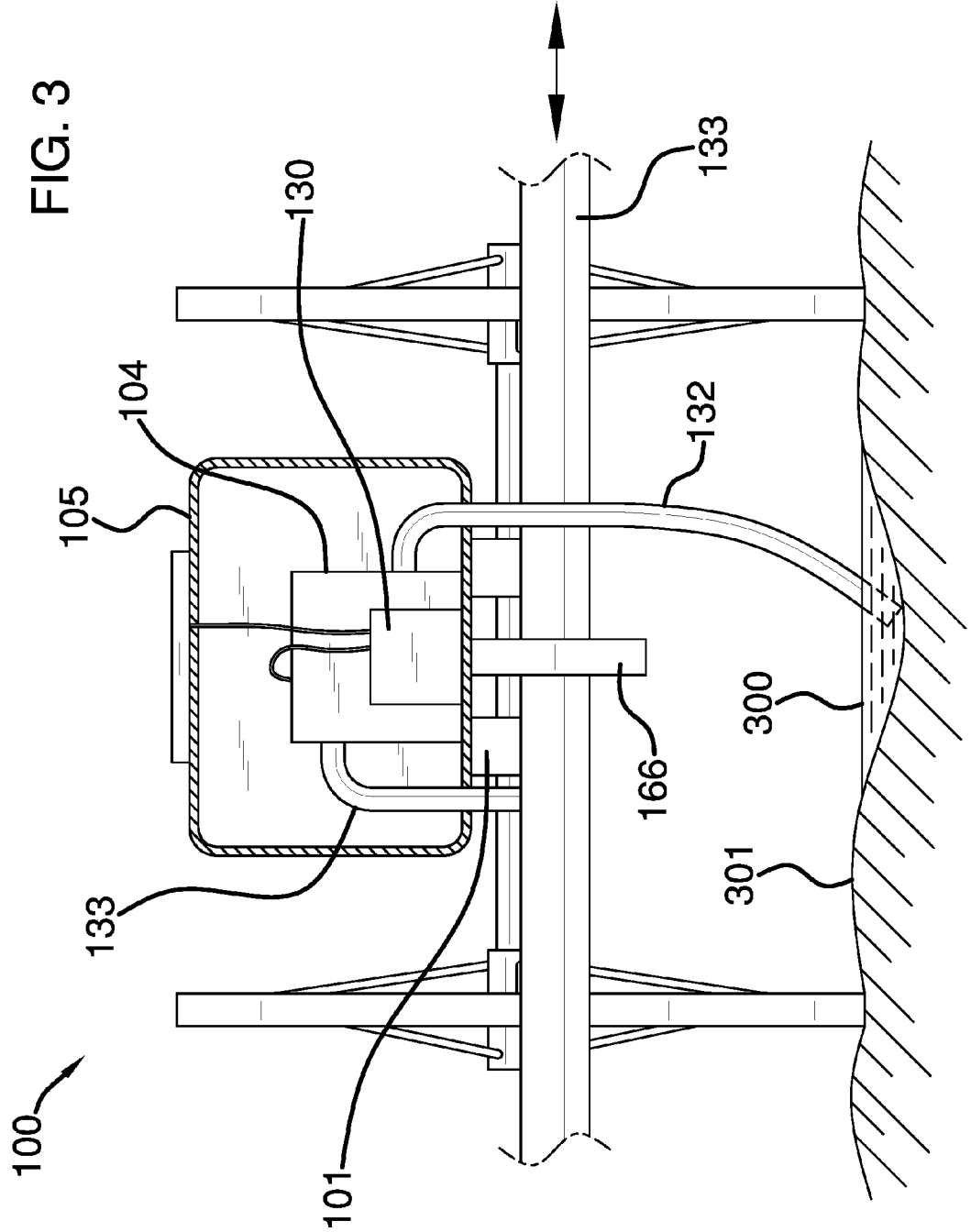
FIG. 3 is another cross-sectional view of an embodiment of the disclosure along line 3-3 in FIG. 1.
Figure 4:
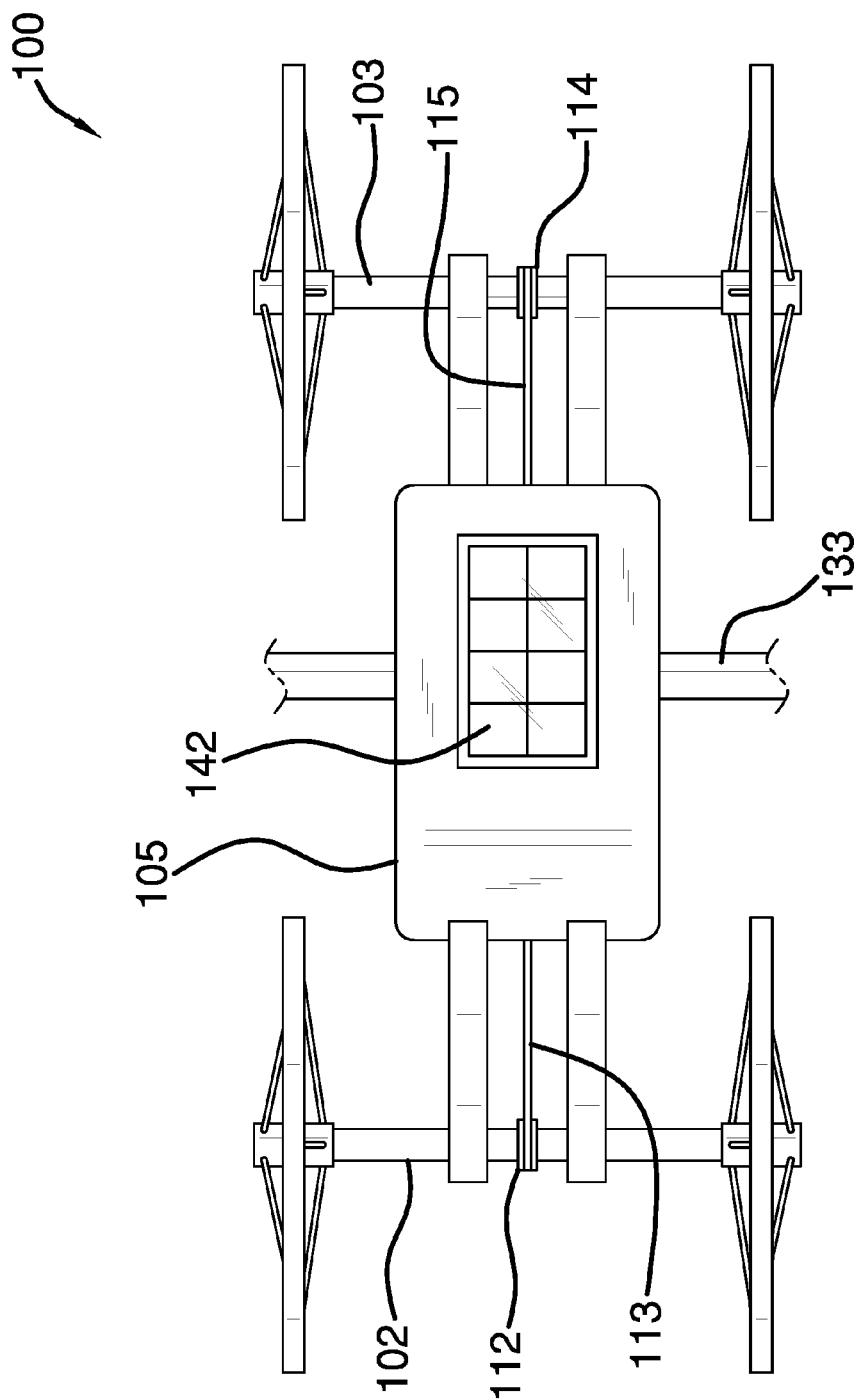
FIG. 4 is a top view of an embodiment of the disclosure.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to one or more potential embodiments of the disclosure, which are illustrated in FIGS. 1 through 6.

The wheeled pumping station 100 (hereinafter invention) includes a chassis 101, a first axle 102, a second axle 103, a pump 104, and a housing 105. The first axle 102 includes a first, left wheel 106, and a first, right wheel 107. The second axle 103 includes a second, left wheel 108, and a second, right wheel 109. It shall be noted that the first, left wheel 106, the first, right wheel 107, the second, left wheel 108, and the second, right wheel 109 are of identical size and construction. It shall be noted that the first, left wheel 106, the first, right wheel 107, the second, left wheel 108, and the second, right wheel 109 may be collectively referred to as a plurality of wheels, or wheels (106-109).

A drive motor 110 is provided with the invention 100. The drive motor 110 is responsible for providing rotational movement to both or either the first axle 102 and the second axle 103. Moreover, the first axle 102 includes a first sprocket 111 connected to a first chain linkage 112. The first chain linkage 112 connects between the first axle 102 and the drive motor 110. The second axle 103 includes a second sprocket 113 connected to a second chain linkage 114. The second chain linkage 114 connects between the second axle 103 and the drive motor 110.

The drive motor 110 is responsible for propelling the invention 100. As currently depicted, the drive motor 110 is only able to propel the invention 100 forward and backward. The invention 100 may require additional componentry to enable the invention 100 to steer or change direction. Simply put, this would either require more chains and sprockets such that each of the wheels 106-109) may be turned independent of one another.

Figure 5:
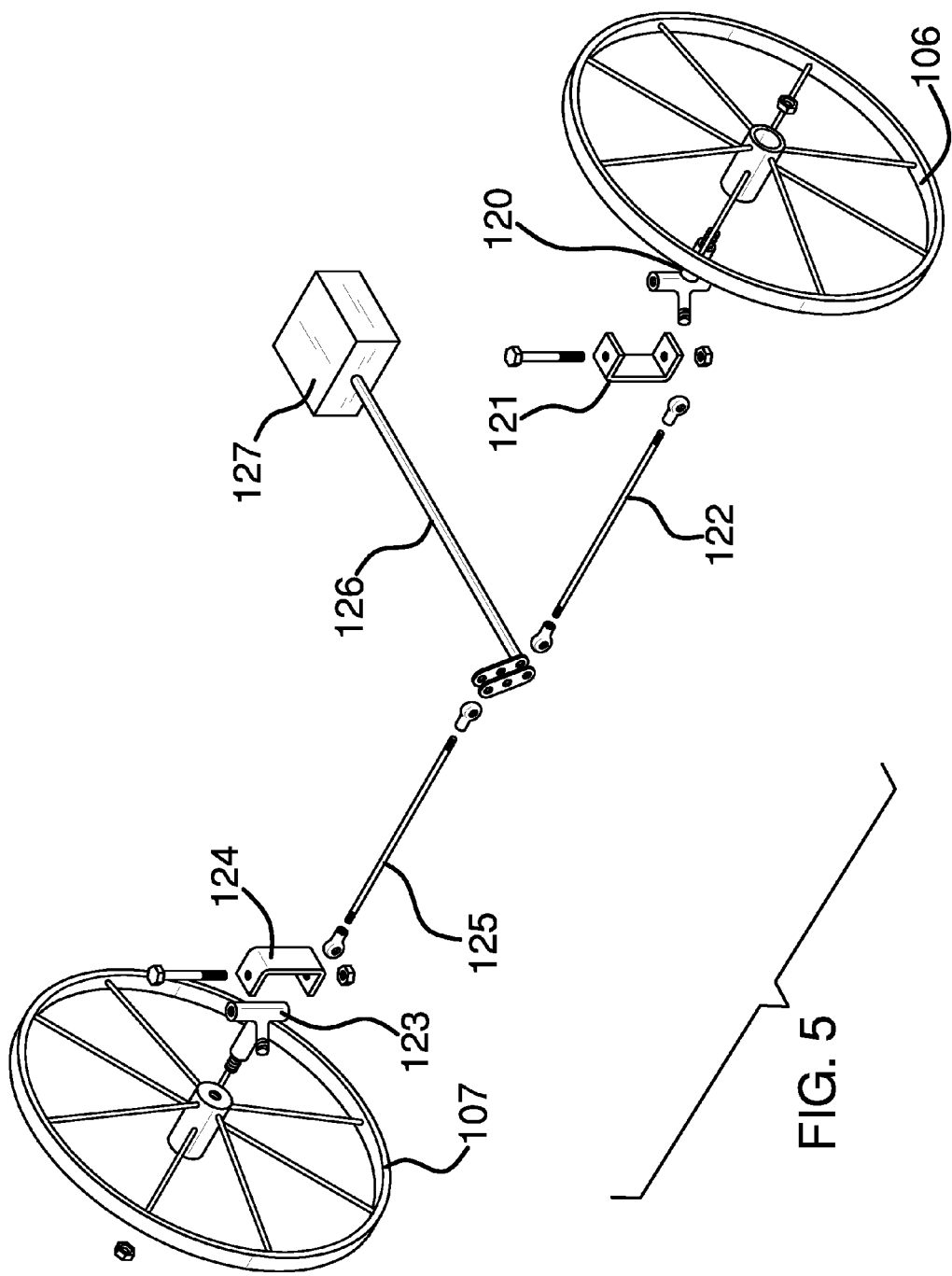
FIG. 5 is a detail of an alternative embodiment of the disclosure.
Figure 6:
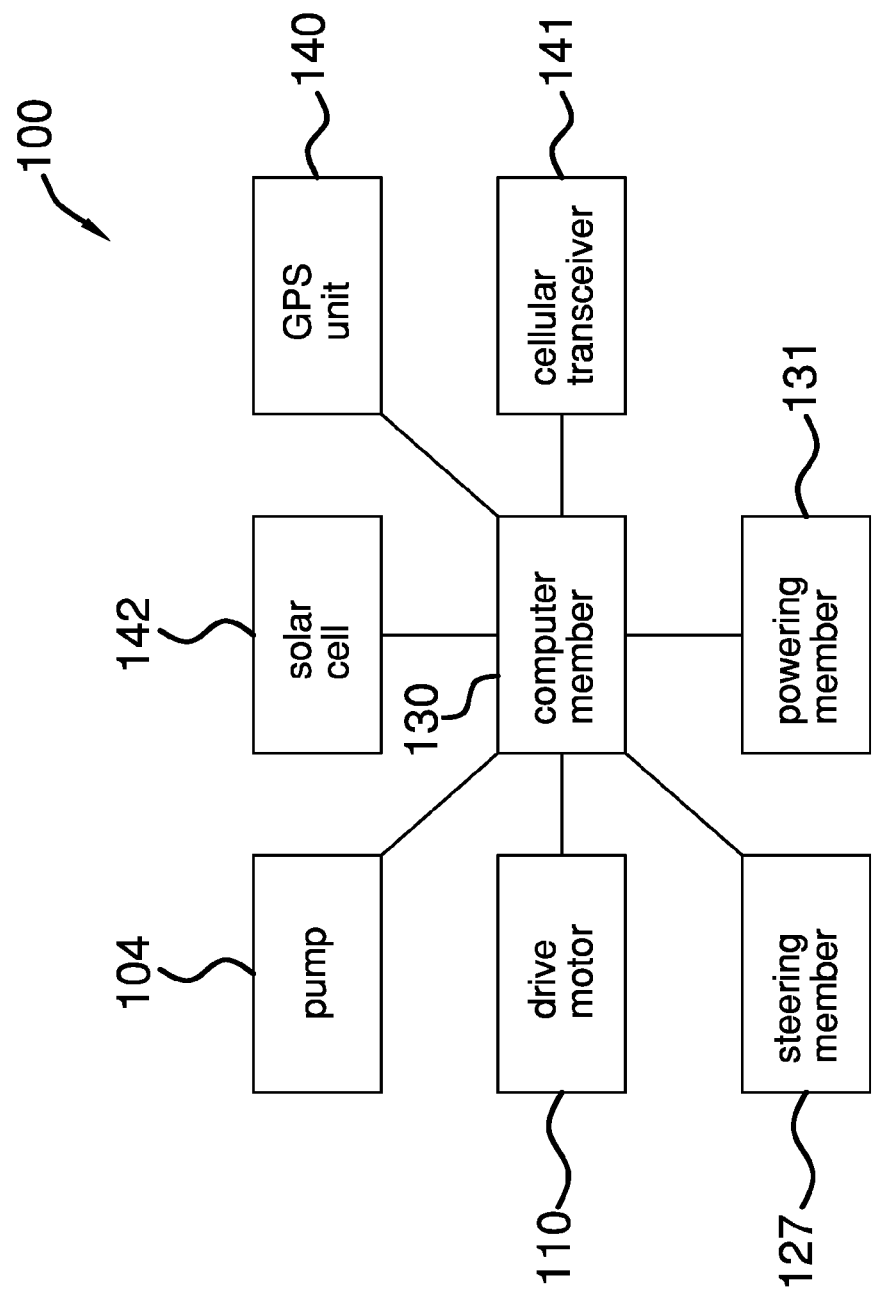
FIG. 6 is a block diagram of various componentry associated with an embodiment of the disclosure.

Referring to FIG. 5, the first, left wheel 106 is attached to a left spindle 120, which in turn is attached to a left bracket 121, and a left tie rod 122. The first, right wheel 107 is attached to a right spindle 123, which in turn is attached to a right bracket 124, and a right tie rod 125. Both the left tie rod 122 and the right tie rod 125 attach to a steering shaft 126, which in turn is attached to a steering member 127. It shall be noted that the steering member 127 is more likely than not, a servomotor that in turn is connected to a computer member 130.

The housing 105 is affixed to the chassis 101. As depicted, the chassis 101 is constructed of four armatures that extend away from the housing 105. The housing 105 houses the drive motor 110, the computer member 130, a powering member 131, and the pump 104. The pump 104 includes an intake hose 132 that extends down from the housing 105. The intake hose 132 is adapted to interface with water 300 resting on a ground surface 301 (refer to FIG. 3). The pump 104 is adapted to draw said water 300 via the intake hose 132. The pump 104 is also attached to an outflow conduit 133. The water 300 pumped via the pump 104, enters the intake hose 132, and is channeled through the pump 104, and out the outflow conduit 132. The outflow conduit 133 also attaches to a main conduit 133 that extends away from the invention 100. The main conduit 133 is supported underneath the housing 105 via a conduit support bracket 166.

It shall be noted that the main conduit 133 is of an undefined length. Moreover, the main function of the invention 100 is to pump the water 300 from the location of the invention 100 to wherever the main conduit 133 terminates. It shall be noted that in use, the invention 100 is ideally transferring the water 300 via the pump 104 and the main conduit 133 to another location where said water 300 is in turn used for farming or some other use, or that water 300 is collected and transported to a $3^{rd}$ location for another use. Whatever the use of the water 300 is beyond the invention 100.

The computer member 130 as depicted in the figures as a box. However, referring to FIG. 6, the computer member 130 is also wired to a GPS unit 140, a cellular transceiver 141, and at least one solar cell 142. The at least one solar cell 142 is able to produce electricity, which in turn is used to recharge the powering member 131 (this is assuming the powering member 131 is at least one battery). It shall be noted that the powering member 131 may be an internal combustion engine (gas or diesel-driven), which is able to provide electrical power in the form of a generator that is in turn wired to the computer member 130. Ideally, the powering member 131 is at least one battery, which is recharged via the at least one solar cell 142.

The GPS unit 140 is wired to the computer member 130 in order to provide location-based data of the invention 100, which in turn aids in operation of the invention 100 in a semi-autonomous capacity. The cellular transceiver 141 enables the invention 100 to communicate wirelessly with another computer system that is able to update or provide instructions and guidance as to where to travel to in order to locate the water 300 that needs to be pumped via the pump 104. The use of the cellular transceiver 141 and the GPS unit 140 in the context of farming equipment is well known in the art. These technologies are readily available.

It shall be noted that wiring 150 is provided for the various connections between the computer member 130, and the steering member 127, the pump 104, the powering member 131, the drive motor 110, and the at least one solar cell 142. The wiring 150 may vary in length or gauge or application of use.

It shall be noted that the componentry of the invention 100 shall be adjusted in order to accommodate efficiencies. The wheels 106-109) may be adjusted in diameter and width and materials. The chassis 101 may be made of a variety of materials and other dimensions as needed to lighten the overall weight of the invention 100. The size of the pump 104 and the drive motor 110 can be adjusted in order to improve power consumption. It may be that the invention 100 creeps along at a maximum speed (not just for safety considerations), but so that the pump 104 can be larger in order to pump more of the water 300 over a shorter duration. Alternatively, the pump 104 may be smaller in order for the drive motor 110 to mobilize the invention 100 from one location to another in a smaller time frame.

With respect to the above description, it is to be realized that the optimum dimensional relationship for the various components of the invention described above and in FIGS. 1 through 6 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:
1. A mobile pumping station comprising:
   a pump that is mobilized via a plurality of wheels and a chassis;
   wherein a computer member operates the pump and a drive motor in a semi-autonomous nature such that the mobile pumping station is able to move from one location to another via the computer member;
   wherein the drive motor is in mechanical connection with the plurality of wheels;

wherein the plurality of wheels is further defined as a first left wheel, a first right wheel, a second left wheel, and a second right wheel;

wherein the chassis is attached to a first axle and a second axle;

wherein the first axle is parallel with the second axle;

wherein the first axle includes the first left wheel, and the first right wheel;

wherein the second axle includes the second left wheel, and the second right wheel;

wherein the drive motor is in mechanical connection with the first axle and the second axle;

wherein the first axle includes a first sprocket connected to a first chain linkage; wherein the first chain linkage connects between the first axle and the drive motor;

wherein the second axle includes a second sprocket connected to a second chain linkage; wherein the second chain linkage connects between the second axle and the drive motor;

wherein the first left wheel is attached to a left spindle, which in turn is attached to a left bracket, and a left tie rod;

wherein the first right wheel is attached to a right spindle, which in turn is attached to a right bracket, and a right tie rod;

wherein both the left tie rod and the right tie rod attach to a steering shaft, which in turn is attached to a steering member; wherein the steering member is wired to the computer member;

wherein the housing is affixed to the chassis; wherein the housing houses the drive motor, the computer member, a powering member, and the pump;

wherein the pump includes an intake hose that extends down from the housing; wherein the intake hose is adapted to interface with water resting on a ground surface;

wherein the pump is adapted to draw said water via the intake hose; wherein the pump is also attached to an outflow conduit; wherein the water pumped via the pump, enters the intake hose, and is channeled through the pump, and out the outflow conduit;

wherein the outflow conduit also attaches to a main conduit that extends away from the mobile pumping station; wherein the main conduit is supported underneath the housing via a conduit support bracket.

2. The mobile pumping station according to claim 1 wherein the computer member is also wired to a GPS unit, and a cellular transceiver.

3. The mobile pumping station according to claim 1 wherein the powering member is an internal combustion engine, which is connected to a generator that is able to provide electrical power to the computer member.

4. The mobile pumping station according to claim 2 wherein the computer member is wired to at least one solar cell; wherein the at least one solar cell is able to produce electricity, which in turn is used to recharge the powering member; wherein the at least one solar cell is provided on the housing.

5. The mobile pumping station according to claim 4 wherein the GPS unit is wired to the computer member in order to provide location-based data of the mobile pumping station; wherein the cellular transceiver enables the computer member to communicate wirelessly with another computer system that is able to update or provide instructions and guidance as to where to travel to in order to locate the water that needs to be pumped via the pump.

* * * * *